April 14, 1953     P. N. WALDESBUEHL     2,634,497
SPATTLE SPOON
Filed May 12, 1947
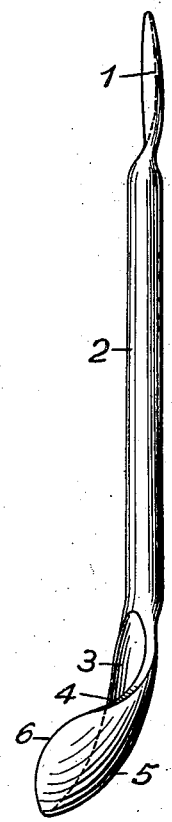
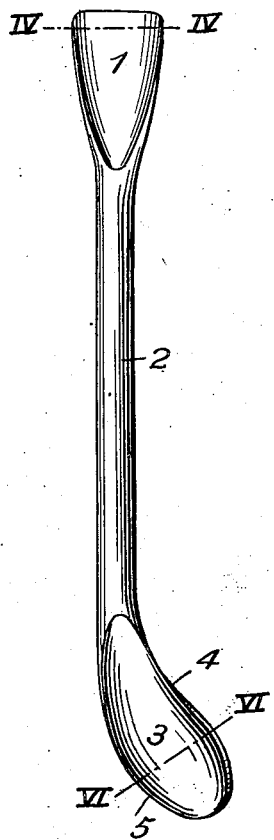
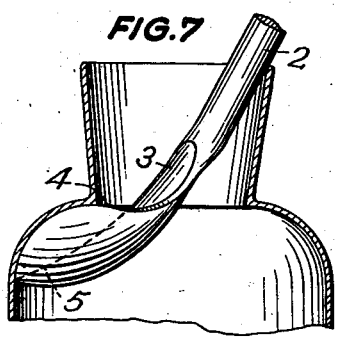
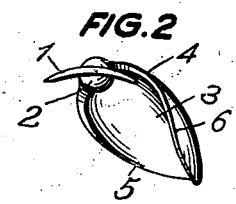
INVENTOR:
Paul Niklaus Waldesbuehl
by Sommers & Young
Attorneys

UNITED STATES PATENT OFFICE 2,634,497

SPATTLE SPOON

Paul Niklaus Waldesbuehl, Bremgarten, Switzerland

Application May 12, 1947, Serial No. 747,531
In Switzerland August 8, 1940

Section 1, Public Law 690, August 8, 1946
Patent expires August 8, 1960

1 Claim. (Cl. 30—142)

This invention has for its object to provide a spoon for removing substances having adhesive tendencies from receptacles and particularly from normally inaccessible recesses therein.

According to the invention, the line joining the centres of the cross-sections of the spoon-bowl bends laterally away from the spoon-handle axis and extends in the form of a helix.

A combined spatula and spoon according to my invention is shown, by way of example, in the accompanying drawing, in which:

Figs. 1, 2 and 3 show the combined spatula and spoon from the front, from above and from the side respectively, Fig. 4 is a cross-section on line IV—IV in Fig. 3, Fig. 5 is a cross-section through the handle, Fig. 6 a cross-section on line VI—VI in Fig. 3, Fig. 7 is a perspective view of a part of the spoon in use in a bottle shown in section.

The spoon shown in the drawings comprises a handle 2, at one end of which a spatula 1 is provided, while the spoon-bowl 3 is provided at the other end thereof. The line joining the centres of the cross-sections of the spoon-bowl (section on line VI—VI in Fig. 3 and sections parallel thereto) is, as shown in Fig. 3, bent laterally away from the axis of handle 2 and extends in the form of a helix so that the bowl 3 is bent forward and, at the same time, laterally with respect to handle 2. By extending the side walls of the bowl forwardly, the depth of the spoon-bowl is increased. As shown by the drawing, a portion of one edge of the bowl is made concave in proximity to the handle, as indicated at 4, while the portion of said edge more remote from the handle is convex as indicated at 6. The other edge 5 of the bowl is roundly convex throughout its extent. Due to the helical form of the medial line of the bowl, the bowl extends forwardly with respect to the handle, and the convex portion 6 of the one edge is the most forwardly positioned part. Immediately adjacent the portion 6 the bowl is comparatively sharply concave so as to form a sort of pocket for retaining material scraped from a surface by the edge portion 6.

The spoon is preferably made of an elastic, hard, non-corrosive light metal alloy. Furthermore, a layer of oxide produced, for example, by the "Ematel process" may be provided thereon. The edges of the spatula and of the bowl are somewhat sharpened in order that these parts may more effectively detach the substance. The combined spatula and spoon could also be made of any other suitable material, for example nickel, iron, porcelain, glass, wood, synthetic substances, such as artificial resin, galalith, etc. The spatula-end could be turned through 180° with respect to the spoon-end, or be arranged in any other position.

With the spoons hitherto employed in laboratories, dispensaries and pharmaceutical stores, which consist of wood, horn, synthetic substances, iron, nickel, etc., and have a straight or curved handle or a curved spoon axis, difficulties are encountered in extracting the substances adhering to the curved neck of the bottle or to the bottom. When the spoon is laden with a substance of granular nature, the substance easily slips back as the spoon is being withdrawn. An inelastic heavy construction, and in particular a metal spoon, often causes breakage of the bottom or of the wall of glass vessels when attempts are made to remove firmly caked substances by prodding. Spoons consisting of horn or synthetic substances frequently break in the same attempt. Such spoons have, moreover, the disadvantage that certain substances adhere to the surface of the spoon. Spoons consisting of horn cannot easily be cleaned with hot water since the layers of horn often warp due to this treatment. In addition, spoons consisting of horn or synthetic substances cannot be sterilised in a flame or by boiling.

In contrast to the known constructions, the construction of the spoon bowl described and illustrated avoids the aforesaid disadvantages. The bowl of the spoon can be applied directly to the inner curvature of a bottle as shown in Fig. 7, and the substance falls into the bowl of the spoon and can be removed from the bottle without danger of its falling out during the withdrawal of the spoon. Substance lying in the bottom of a bottle can also be completely removed with the spoon.

What I claim and desire to secure by Letters Patent is:

A spoon for withdrawing substances from inaccessible recesses of receptacles, comprising a stem, one end portion of the stem being extended in a spoon bowl, the longitudinal axis of the spoon bowl being helically curved and the free end of the bowl being laterally offset from the axis of the stem, one lateral edge of the spoon bowl having a concave edge portion adjacent to the stem and a convex edge portion towards the free end of the bowl, said convex portion forming a scraping edge, and the other lateral edge of the spoon bowl having a convex curvature, the deepest portion of the spoon bowl being substantially in the center thereof and the lateral and front edges of the bowl being disposed forwardly with respect to the center so that the substances scraped off by said convex scraping edge portion may collect within the bowl.

PAUL NIKLAUS WALDESBUEHL.

References Cited in the file of this patent

UNITED STATES PATENTS

| Number | Name | Date |
|---|---|---|
| 944,091 | Harn | Dec. 21, 1909 |
| 990,748 | Kniffen | Apr. 25, 1911 |
| 1,135,185 | Hunt | Apr. 13, 1915 |
| 2,019,566 | Gray | Nov. 5, 1935 |

FOREIGN PATENTS

| Number | Country | Date |
|---|---|---|
| 565,107 | France | Nov. 3, 1923 |